R. FRAZER & B. J. ROBERTSON.
MILLING MACHINE.
APPLICATION FILED JULY 20, 1917.

1,296,066.

Patented Mar. 4, 1919.
7 SHEETS—SHEET 1.

Witnesses

Inventors
Ray Frazer
and Burton J. Robertson
By William Bradbury
Attorneys

UNITED STATES PATENT OFFICE.

RAY FRAZER AND BURTON J. ROBERTSON, OF MINNEAPOLIS, MINNESOTA, ASSIGNORS TO LYLE CORRUGATED CULVERT COMPANY, OF MINNEAPOLIS, MINNESOTA, A CORPORATION OF MINNESOTA.

MILLING-MACHINE.

1,296,066.   Specification of Letters Patent.   Patented Mar. 4, 1919.

Application filed July 20, 1917. Serial No. 181,706.

*To all whom it may concern:*

Be it known that we, RAY FRAZER and BURTON J. ROBERTSON, citizens of the United States, residing at Minneapolis, in the county of Hennepin and State of Minnesota, have invented a certain new and useful Improvement in Milling-Machines, of which the following is a full, clear, concise, and exact description, reference being had to the accompanying drawings, forming a part of this specification.

Our invention relates to milling machines, and has for its object the provision of a device of this class which operates on the principal of the pantograph wherein a plurality of arms are employed, one of which forms the reproducing arm of the pantograph and another the tracing arm thereof. The machine of our invention is intended primarily for heavy work and must necessarily be constructed relatively large and heavy.

It is one of the objects of the present invention to provide a pantograph milling machine which, although comparatively large and heavy, maintains the accuracy of the similar pantograph machines employed in the past, only in connection with small work such, for example, as engraving jewelry and the like.

In accomplishing this general object we provide several improved arrangements whereby it is possible to construct a large machine which is accurate in its operation and which can be handled and operated as easily as the smaller pantograph machines.

A further object of the present invention is the provision of novel arrangements of anti-friction means which coöperate to produce a pantograph of the class described, and which enable the arms of the pantograph to be swung relatively to one another and about the main pivot with the least amount of effort in case the machine is manually operated or with the least amount of energy in case the machine is mechanically operated.

In the preferred form of our invention we provide a mechanical feed for the tracing arm of the pantograph and in connection with this mechanical feed we provide certain improved mechanism which enables the operator to cause the tracing arm of the pantograph to travel in either one of two directions.

Another improved arrangement of the present invention consists in certain transmission mechanism extending between the main pivot of the pantograph and the tracing arm thereof for transmitting power from the main pivot to the tracing arm. This transmission gearing is arranged so that it may be adjusted and operated regardless of the positions of the several arms of the pantograph relatively to one another. The several pantograph arms are adjustable so that the reproduction resulting from the operation of the pantograph may be of any size or have any desired ratio with respect to the previously prepared form over which the tracing arm of the pantograph is adapted to move.

A further object of the present invention is the provision of improved means to facilitate the adjustment of the several arms of the pantograph relatively to one another so that any desired ratio between the previously prepared form and the reproduction of the pantograph may be had. The mechanism for accomplishing this object consists of certain improved pivoting members which are arranged to be attached to the arms of the pantograph and may be adjusted easily and quickly.

A further object of the present invention is the provision of novel mechanism for lifting the reproducer of the pantograph, which in the preferred form of our invention takes the form of a milling tool, out of or into engagement with the work. This mechanism is controlled by a linkage system which extends from the reproducer around the arms of the pantograph to the tracing arm thereof, where a suitable handle is employed, the handle being arranged to be grasped by the operator and actuated to cause operation of the mechanism for lifting or lowering the pantograph reproducer. Because of the fact that the linkage system just referred to extends around the arms of the pantograph and because the pantograph arms must move relatively to one another during the operation of the machine, it is necessary to provide a certain universal joint connection in the linkage system, in order that the system be operative regardless of the position the arms may assume relatively to one another. This universal joint connection forms one of the improved features of the present invention.

In addition to the above, the machine of our invention contains certain other improvements and it is thought that these together with those mentioned above will be understood more clearly by referring to the accompanying drawings wherein.

Similar characters of reference refer to similar parts throughout the several views.

Figure 1:
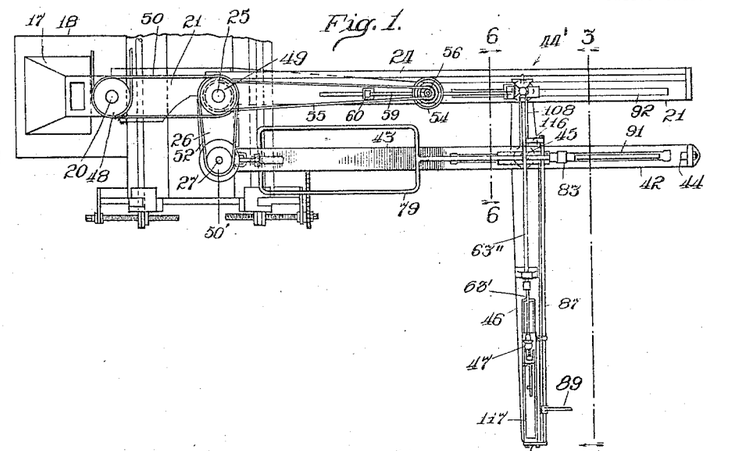
Figure 1 illustrates a plan view of the machine of our invention.
Figure 2:
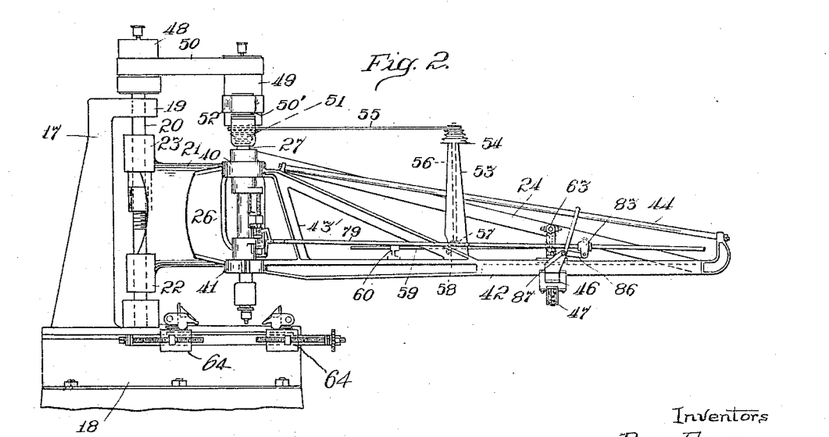
Fig. 2 is a front elevational view thereof.
Figure 3:
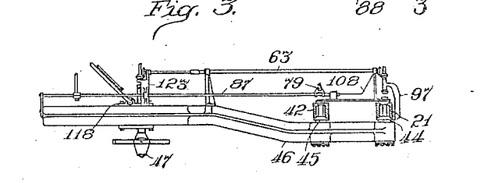
Fig. 3 is a vertical cross-sectional view taken along the line 3—3 of Fig. 1, looking in the direction indicated by the arrows.

Referring first to Figs. 1, 2 and 3, which show the entire machine, 17 designates a bracket carried by a suitable base 18, the bracket and base being comparatively heavy to support the entire weight of the pantograph. The upper end of the bracket 17 forms a support at 19 through which the main supporting shaft 20 extends, the lower end of the shaft being supported by the base 18. Pivotally mounted on the shaft 20 is the main arm 21 of the pantograph. The pivotal connection between the shaft 20 and the arm 21 is formed by the journal pieces 22 and 23 which form a part of the arm 21 and which contain suitable bearings enabling the arm 21 to be swung about its pivot 20 with the least amount of friction.

The arm 21 extends outwardly from its pivot as shown in Fig. 2, and to reinforce the arm the brace 24 is employed. This brace extending from the inner end of the arm to the outer end of the arm is most clearly shown in Fig. 2.

Figure 4:
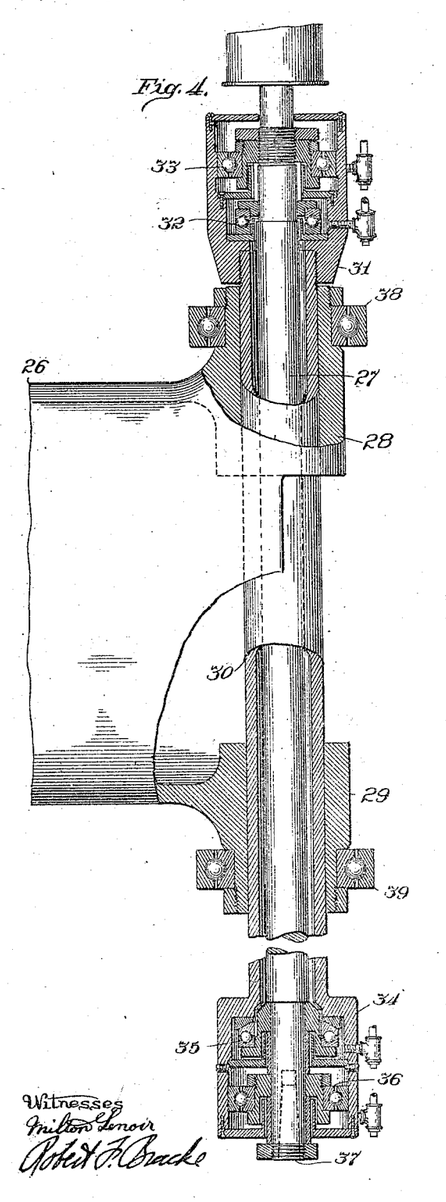
Fig. 4 is an enlarged detail view partly in elevation and partly in section of the reproducing arm of the pantograph and the vertically disposed shaft mounted therein.

Mounted in the arm 21 is a vertically disposed shaft 25, to which is pivotally secured the arm 26 which extends forwardly and journals the shaft or spindle 27 as most clearly shown in Fig. 4.

The arm 26 and that portion of the arm 21 extending between the shaft 25 and the shaft 20, is tubular in formation and elliptical in shape as illustrated to provide arms that, though exceedingly strong and capable of withstanding a great amount of weight, are comparatively light in weight.

Referring now to Fig. 4, the outer end of the arm 26 forms two sleeves, shown at 28 and 29, through which the sleeve 30 extends. The upper end of the sleeve 30 is provided with external threads arranged to receive the housing 31, provided with the anti-friction ball bearing arrangement shown at 32 and 33. The upper end of the shaft 27 coöperates with the ball bearing mechanism, as illustrated, to insure a minimum amount of friction. The lower end of the sleeve 30 forms the housing 34 containing the ball bearings shown at 35 and 36, which coöperate to journal the lower end of the shaft 27. The extreme lower end of the shaft 27 is arranged at 37 to receive a reproducer or milling tool adapted to operate upon the work.

Extending around the sleeves 28 and 29 are the ball bearings 38 and 39, respectively, around which the sleeves 40 and 41 of the pantograph arm 42 extend. This arm 42 extends outwardly, parallel to the arm 21, and is provided with certain reinforcing members 43 and 44. Pivoted to the arms 21 and 42 at 44' and 45, respectively, is an arm 46 which extends outwardly parallel with arm 26.

The outer end of the arm 46 carries the tracer 47, which is arranged to coöperate with and travel over a previously prepared form. The details of this tracer will be described in detail hereinafter.

Mounted on the upper end of the shaft 20, which forms the main pivot of the pantograph, is a pulley 48, which is connected to a suitable source of power and which in turn transmits the power necessary to operate the reproducer and the tracer of the pantograph.

The upper end of the shaft 25 carries a pulley 49 which is mechanically connected with the pulley 48 by the belt shown at 50. The upper end of the shaft or spindle 27 which carries the milling tool is provided with a main pulley 50¹ and the auxiliary cone pulley 51, the pulley 50¹ being connected with the pulley 49 of the shaft 25 by the belt 52. Mounted on the arm 21 and extending upwardly therefrom is a hollow conical support 53, the upper end of which carries the cone pulley 54. This cone pulley is connected with the cone pulley 51 by the belt 55. The arrangement of pulleys 51 and 54 makes it possible to rotate the pulley 54 at any speed within certain limits with respect to the main pulley.

Connected with the pulley 54 and extending downwardly through the support 53, is a shaft 56, the lower end of which carries a beveled gear 57 meshing with a beveled gear 58, adjustably mounted on the shaft 59 journaled at its left-hand end (Fig. 2) in a bracket 60 mounted on the arm 21.

The right-hand end of the shaft 59 (Fig. 2) is supported in a suitable bracket to be fully described hereinafter. The outer end of the shaft 59 carries the beveled gear 61, meshing with the beveled gear 62, arranged to drive the shaft 63, which extends outwardly over the arm 46 and serves to drive the pantograph tracer, as will be described hereinafter.

We will now describe the mechanism for raising and lowering the reproducer out of and into engagement with the work.

In Fig. 2 we have shown at 64 suitable mechanism for holding the work to be acted upon by the reproducer. This mechanism may be of any suitable construction, and may consist of clamping members arranged to hold the work to the base 18.

Figure 5:
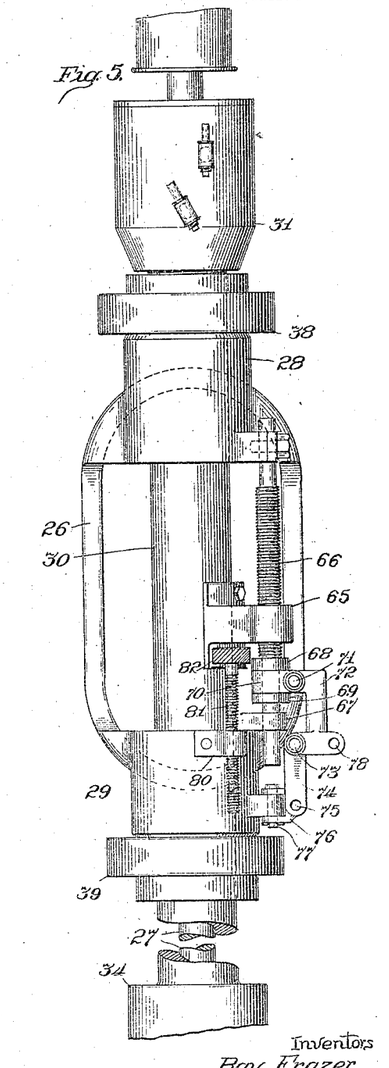
Fig. 5 is a front elevational view of Fig. 4.

In Fig. 2 we have shown the reproducer or milling tool as being lowered into position so that it may perform the milling operation. In Figs. 4 and 5 we have illustrated the reproducer as being elevated out of engagement with the work.

In Fig. 5, 65 designates a nut rigidly secured to the sleeve 30. This nut has threading engagement with the screw 66, the upper end of which is journaled in a projection extending outwardly from the sleeve 28 of the arm 26. The lower end of the worm is journaled in the projection 67 extending outwardly from the sleeve 29. The connection between the worm 66 and the sleeves 28 and 29 is such that the worm 66 may have vertical movement relatively to the sleeves 28 and 29. The lower end of the worm 66 carries two collars 68 and 69, between which is interposed a sleeve 70, the sleeve being rotatively mounted around the worm. Pivoted to the sleeve 70, at 71, is a toggle lever 72, which has its lower end pivoted at 73 to a second lever 74, the lower end of the second lever being pivotally connected at 75 with a link 76. The link is connected by the vertically disposed pin 77 with the sleeve 29, the pin 77 being in coaxial alinement with the worm.

From the construction thus far described, it will be observed that the toggle levers 72 and 74 may be swung about the axis of the worm. The lever 72 is connected at 78 with a rod 79 through which the toggle levers are operated.

The sleeve 29 is provided with a projection 80, which is internally threaded to receive the adjusting screw, shown at 81, the upper end of which is formed into a knurled head 82, assuming a position directly under the nut 65. When the toggle levers 72 and 74 are pulled outwardly to the position shown in Fig. 2, the worm 66 is pulled downwardly with the result that the sleeve 30, together with the shaft or spindle 27, is also moved downwardly, the downward movement of the sleeve 30 being limited by the adjustable screw 81. By this construction the lowermost position of the milling tool and thus the depth of the cut in the work may be determined. By manipulating the worm 66 the sleeve 30 may be set to any position with respect to the worm, so that the milling tool may be set to operate on a piece of work having practically any thickness.

Figures 7, 8:
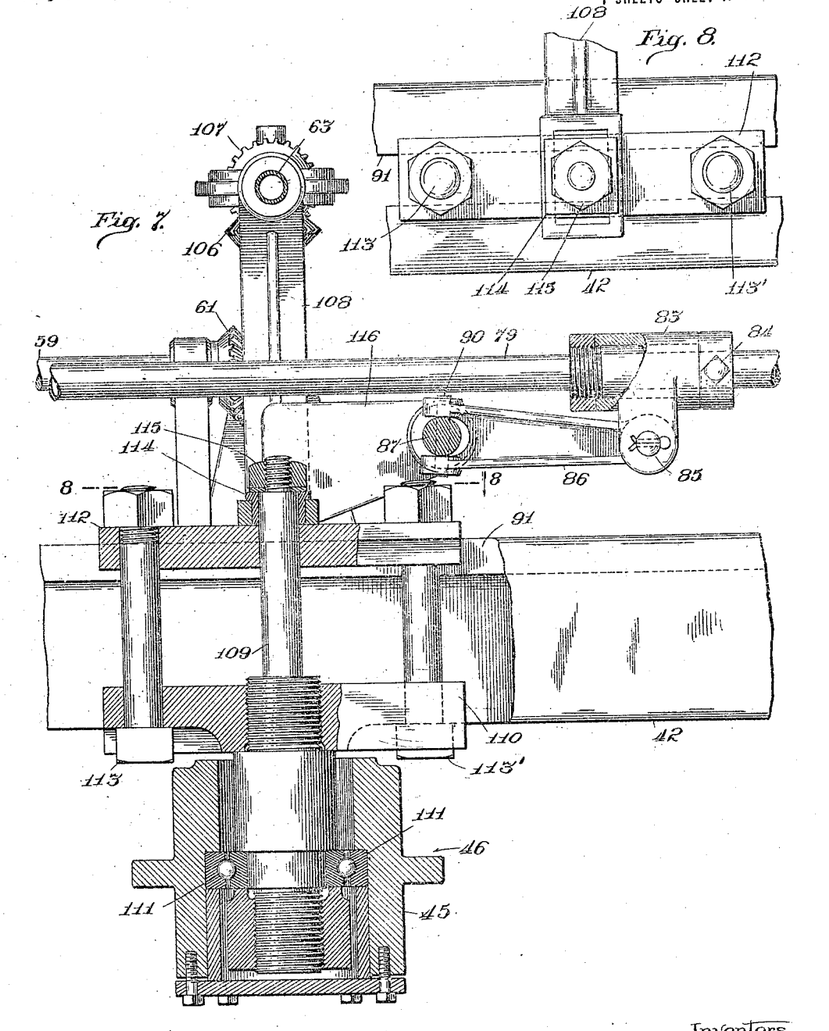
Fig. 7 is a vertical cross-sectional view taken along the line 7—7 of Fig. 6, looking in the direction indicated by the arrows.
Fig. 8 is a fragmentary plan view of the pivotal connection shown in cross-section in Fig. 7.

The rod 79 extends outwardly from the toggle levers around the brace rod 43 of the arm 42, and is connected with an adjustable sleeve 83 (Fig. 7). This sleeve is arranged to be secured to the rod 79 by the set screw, shown at 84. The underside of the sleeve 83 is pivotally connected at 85 with an arm 86 attached to a rod 87, extending outwardly along the arm 46 and journaling in a bracket 88 carried at the end of the arm. A handle 89 is mounted on the shaft 87 so that the operator may rotate the shaft to operate the toggle levers.

The connection between the arm 86 and the shaft 87 is obtained by a pin 90, which extends through the shaft 87 and through the bifurcated end of the arm 86, the connection being such that the arm 86 may swing in a horizontal plane about the pin 90 within certain limits. By swinging the handle 89 in a counter-clockwise direction (Fig. 2) the rod 79 is moved in a direction to cause the toggle levers to lift the pantograph reproduced. Due to the pivotal or universal joint connection between the shaft 87 and the arm 86, it is possible to operate the rod 87 by the handle 89, regardless of the position which the arm 46 of the pantograph may assume relatively to the other arms.

Figure 6:
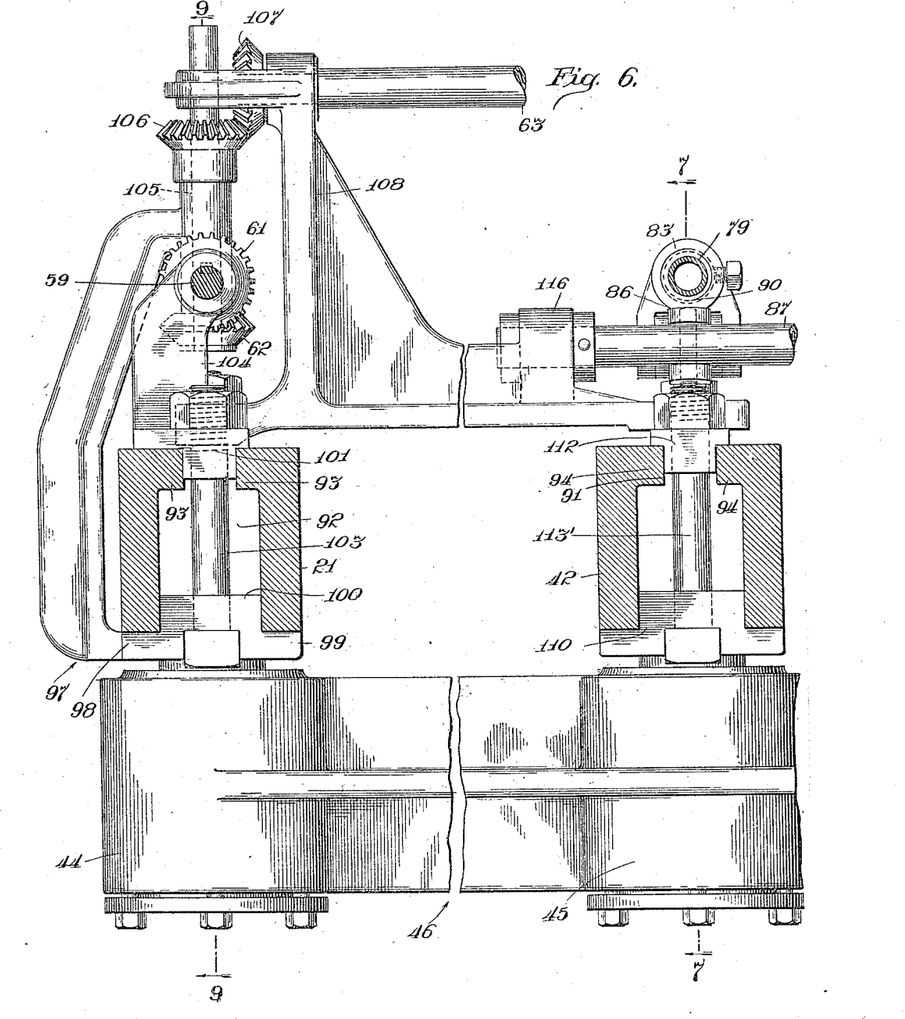
Fig. 6 is an enlarged cross-sectional view taken along the line 6—6 of Fig. 1, looking in the direction indicated by the arrows.

To facilitate adjustment of the arm 46 upon the arms 21 and 42, the arm 42 is slotted, as shown at 91, in Fig. 1, and the arm 21 is similarly slotted to provide the slot shown at 92 (Fig. 6). As most clearly shown in Figs. 6 to 9 inclusive, the arm 21 is slotted so as to provide the two inwardly projecting flanges 93—93 on the upper face of the arm, and the arm 42 slotted to provide the two inwardly projecting flanges 94—94.

Figures 9, 10, 11:
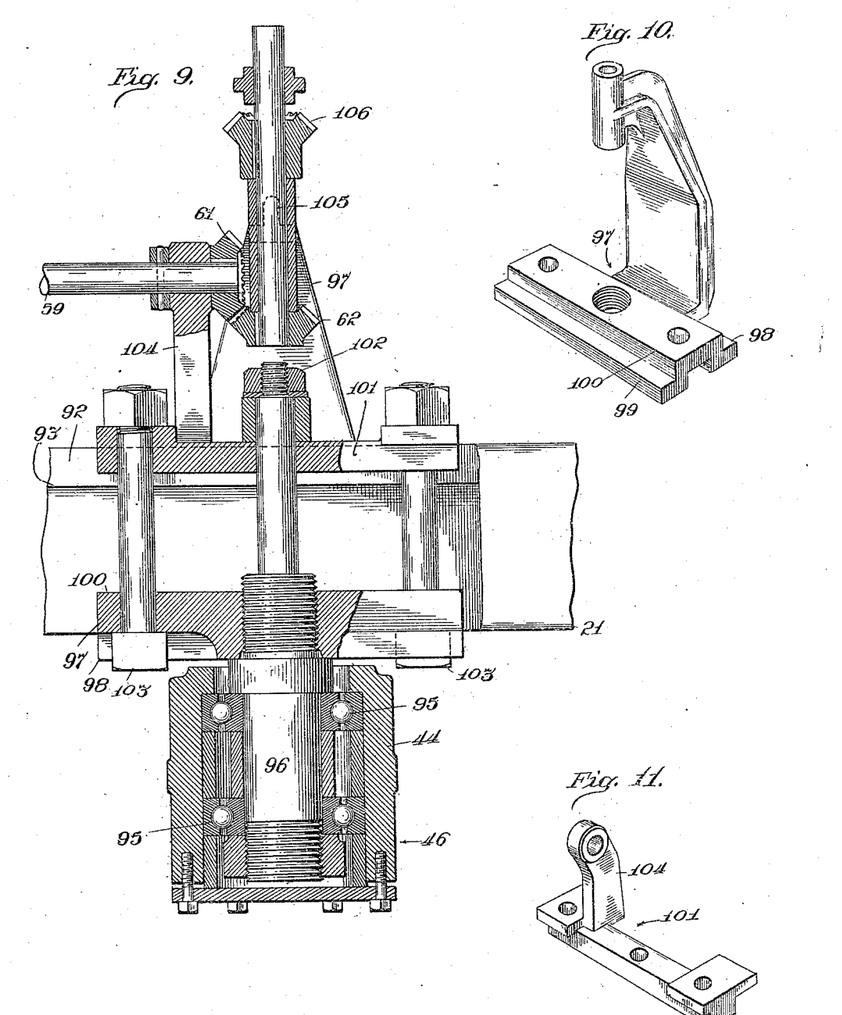
Fig. 9 is a vertical cross-sectional view taken along the line 9—9 of Fig. 6, looking in the direction indicated by the arrows.
Fig. 10 is a detailed perspective view of the bracket shown in Figs. 6 and 9, for supporting certain of the transmission gearing extending between the main pivot of the pantograph and the tracer.
Fig. 11 is a detailed perspective view of another bracket shown in Figs. 6 and 9, for supporting certain of the transmission gearing.

The pivotal connection 44 between the arm 46 and the arm 21, is shown in detail in Fig. 9, and comprises suitable anti-friction ball bearings 95 interposed between the arm 46 and the spindle 96. This spindle extends upwardly and is screw-threaded into a bracket 97, provided with the latterly extending flanges 98 and 99 abutting against the underside of the arm 21. This bracket as most clearly shown in Figs. 6 and 10, is provided with a central ridge 100 which extends upwardly into the slot 92 of the arm 21.

The upper end of the spindle 96 extends through a plate 101, as shown in Fig. 9. The bracket 97 and the plate 101 are securely held in place by the bolts 103—103 which extend upwardly through the slot 92. The plate 101, as most clearly shown in Figs. 9 and 11, carries an upwardly extending support 104, which forms a journal for the outer end of the shaft 59, upon which the beveled gear 61 is mounted. The beveled gear 61 meshes with the beveled gear 62, mounted on a vertically disposed shaft 105, journaled in the bracket 97.

The upper end of the shaft 105 carries the beveled gear 106, which meshes with the beveled gear 107 mounted on the shaft 63.

The inner end of the shaft 63 is journaled in a bracket 108, having its lower end pivoted to the spindle 96 and interposed between the nut 102 and the plate 101.

The front end of the bracket 108 is pivotally connected with the arm 42 by the spindle 109, which screw-threads into a plate 110 and extends downwardly into the arm 46. Suitable anti-friction ball bearing mechanism is employed at 111 between the arm 46 and the spindle 109. The plate 110 extends upwardly into the groove 91, as most clearly shown in Fig. 6, and is connected with a plate 112 on the upper surface of the arm 42 by the bolts shown at 113 and 113¹. The upper end of the spindle 109 extends through a plug 114, adjustably mounted in the front end of the bracket 108. A nut is screwed to the upper end of the spindle 109 at 115 to hold the parts in place. The inner end of the shaft 87, which forms part of the toggle operating mechanism, is journaled in the projection 116, which extends upwardly from the bracket 108, as most clearly shown in Figs. 6 and 7.

From the construction thus far described, it will be noted that the spindles 96 and 109, and thus the entire arm 46 may be adjusted relatively to the arms 21 and 42, and that such adjustment may be made quickly and easily by the manipulation of the bolts 103—103, 113 and 113¹. To adjust the spindle 96, or, in other words, to move it longitudinally relatively to its arm 21 the bolts 103—103 are loosened and the plate 101 and bracket 97 moved to the position desired. In a like manner the spindle 109 may be moved to the position desired.

On account of the beveled gear arrangement 61, 62, 106 and 107, it is possible to swing the arms relatively to each other without in any way interfering with the power transmission devices. When the plate 101, together with its upwardly extending support 104, is adjusted or moved with respect to the arm 21, the entire shaft 59 is moved in its bearings 60 and the beveled gear 58 adjusted relative to the shaft 59 so that it may continue to mesh with the beveled gear 57 of the shaft 56.

We will now describe the tracer of the pantograph and the mechanism which makes it possible to adjust the tracer with respect to its arm 46, so that the desired ratio between the previously prepared form and the reproduction may be had.

Figures 12, 13:
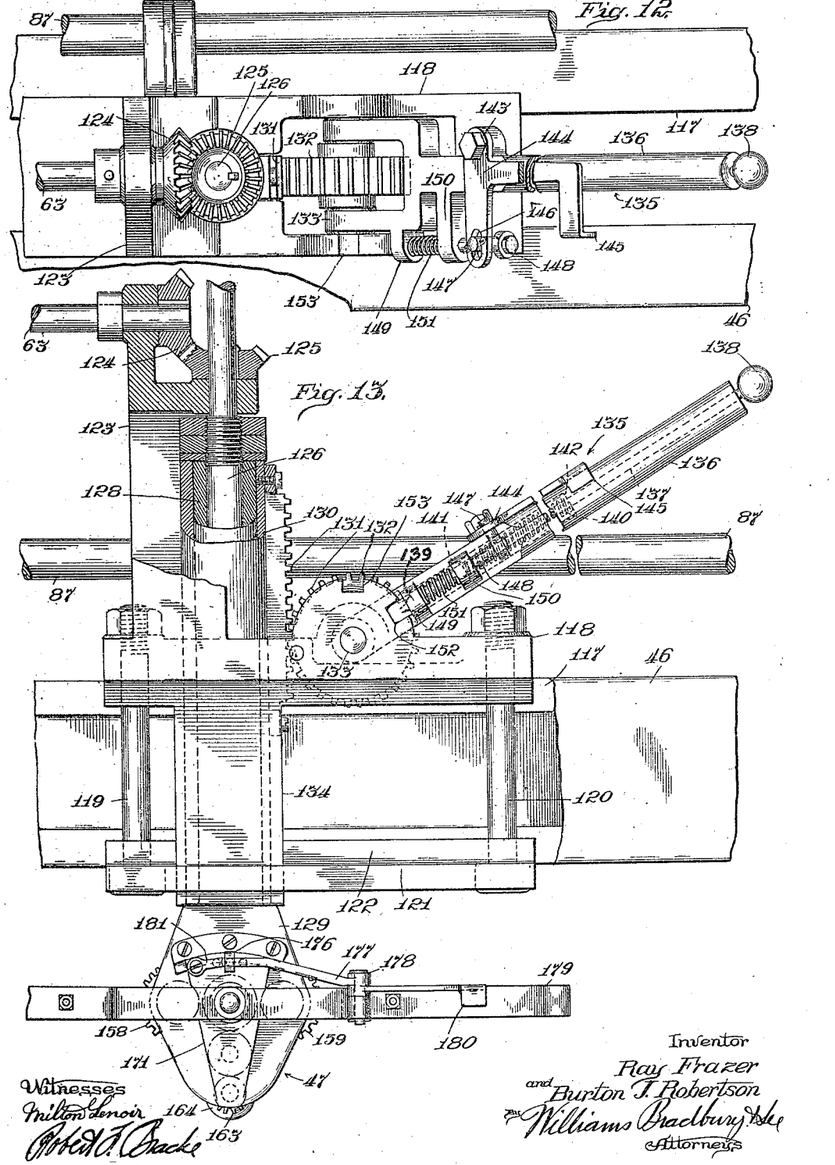
Fig. 12 is an enlarged fragmentary plan view of a portion of the tracing arm and the tracer adjustably mounted thereon.
Fig. 13 is a front view of Fig. 12, some of the parts being shown in section to illustrate more clearly the internal construction of some of the parts.

The outer end of the arm 46 is slotted, as shown at 117, in Figs. 1, 12 and 13. This slot is similar in all respects to the slots 91 and 92 provided in the arms 42 and 21, respectively. Extending downwardly into the slot 117 and engaging the upper face of the arm 46, is a support 118. This support is arranged to be secured to the arm 46 by bolts 119 and 120 which extend downwardly through the slot 117 and coöperate with the locking plate 121, provided with a central ridge 122 and arranged to engage the under face of the arm 46.

The support 118 extends upwardly in the form of a bracket 123, which supports the outer end of the shaft 63. The outer end of the shaft 63 carries a beveled gear 124 meshing with the beveled gear 125, mounted on a vertically disposed shaft 126. The upper end of this shaft contains a key slot arranged to coöperate with a key carried by the beveled gear 125, the key and slot connection being such that the shaft 126 may be moved vertically, independently of the beveled gear 125.

Figures 14, 15, 16:
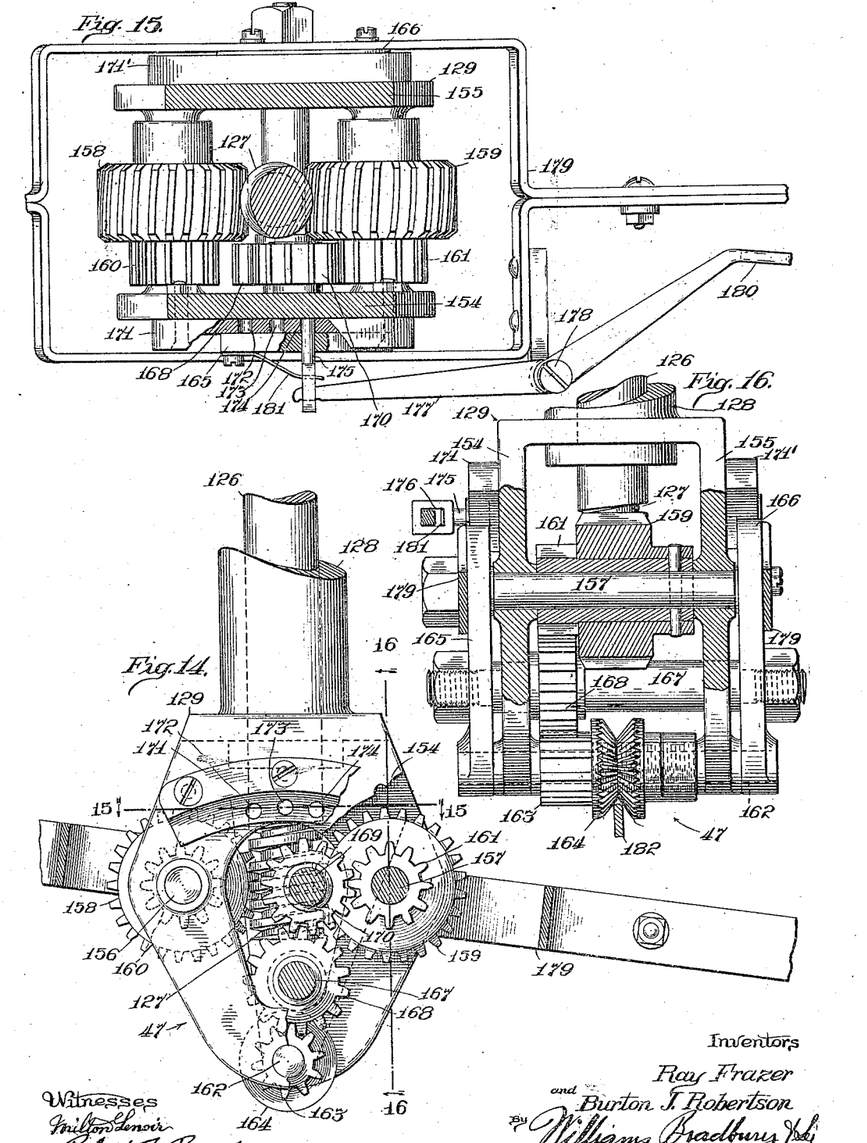
Fig. 14 is an enlarged detailed side elevational view of the lower end of the tracer, some of the parts being broken away to illustrate more clearly the arrangement of gearing employed.
Fig. 15 is a horizontal cross-sectional view taken along the line 15—15 of Fig. 14, looking in the direction indicated by the arrows.
Fig. 16 is a side elevational view of Fig. 14, some of the parts being broken away to reveal the internal construction.

The lower end of the shaft 126 extends downwardly and terminates in the worm 127 (Fig. 14). Mounted around the shaft 126 is a sleeve 128, which extends downwardly and terminates in a casing 129. The sleeve 128 is arranged to have rotative movement independently of the shaft 126, but is longitudinally fixed thereto. A sleeve 130 extends around the sleeve 128, and is attached to a gear rack 131. The sleeve 130 is arranged to move longitudinally with the sleeve 128 and shaft 126, but is not permitted to rotate. The gear rack 131, meshes with a gear 132 journaled to the support 118 at 133. The sleeve 130 is arranged to reciprocate within the tubular boss 134 projecting downwardly from the support 118, so that upon rotation of the gear 132 the casing 129 may be raised or lowered without disconnecting the mechanical connection between the shaft 63 and the shaft 126.

To produce rotation of the gear 132 so as to raise or lower the tracer, we employ the operating mechanism shown at 135. This mechanism consists of a main lever 136 having its lower end bifurcated and pivoted to the support 118, at 133. Reciprocally mounted in the lever 136 is a plunger 137, provided with a finger-piece at 138 and a detent at 139, the detent being arranged to engage the teeth of the gear 132. To hold the detent 139 normally in engagement with the teeth of the gear 132 the coil compression spring 140 is interposed between the enlarged end 141 of the plunger 137 and the wall 142 on the inside of the lever 136. Pivoted on the upper side of the lever 136 at 143 is a bell crank lever 144, provided with a finger piece 145 on one of its arms and a slot 146 in the other arm. Extending upwardly through the slot 146 is a pin 147 carried by a plunger 148 mounted for reciprocation in the projections 149 and 150 carried by the lever 136. A coiled spring 151 is interposed between the projection 150 and the enlarged lower end of the plunger 148, the tendency of the spring being to move the plunger toward the pivot 133. The support 118 is provided with two depressions or notches 152 and 153, each arranged to receive the lower end of the plunger 148.

In Fig. 13 we have shown the tracing mechanism as being in its elevated position. If now the lever 136 is grasped and the thumb pressed against the finger piece 145 of the bell crank lever 144, the plunger 148 will be withdrawn from the notch 152, so that the lever 136 will be released from the support 118. If now the lever 136 is rotated in a counter-clock-wise direction (Fig. 13) the gear 132 will be rotated likewise, with the result that the tracing mechanism will be lowered into engagement with the previously prepared form. To hold the tracing mechanism in its lowermost position the thumb piece 145 is then released to permit the plunger 148 to project downwardly into the notch 153. By disconnecting the detent 139 from the gear 132, which is accomplished by pulling upwardly on the finger piece 138 and by releasing the plunger 148 from the support 118, the lever 136 may be moved independently of the gear 132 so that any desired adjustment between the lever 136 and the gear 132 may be had. It becomes necessary to effect this adjustment only when forms of different height are used in connection with the tracer.

Having thus described the mechanism for raising and lowering the tracer, we will now describe the details of the lower end of the tracer and the mechanism which makes it possible to feed the tracing arm of the pantograph in either one of two directions without the necessity of turning the entire casing 129.

Referring now to Figs. 14, 15 and 16 the casing 129 forms the two walls 154 and 155. Journaled in the walls 154 and 155 are the shafts 156 and 157, the former of which is rigidly connected with the worm wheel 158, and the latter with the worm wheel 159. The worm wheels 158 and 159 mesh permanently with worm 127 forming part of the shaft 126. Rigidly connected with the shaft 156 is a pinion 160. A similar pinion is provided at 161 rigidly secured to the shaft 157. The worm wheels 158 and 159 are disposed on opposite sides of the worm 127, so that upon rotation of the shaft 126 the pinions 160 and 161 are rotated in opposite directions.

The lower end of the walls 154 and 155 carry a pin 162, on which is mounted a pinion 163 and a grooved and notched wheel 164, the pinion and wheel being rigidly connected with one another so as to rotate in unison. Mounted on the pin 162 on the outside of the walls 154 and 155 are the plates 165 and 166, these plates being adapted for oscillation about the pin 162. Journaled in the plates 165 and 166 is a shaft 167, which serves to support a pinion 168 permanently meshing with the pinion 163. The shaft 167 extends through suitable apertures provided in the walls 154 and 155, as most clearly shown in Fig. 14. The plate 165 carries a stud 169, upon which is rotatably mounted a pinion 170, meshing permanently with the pinion 168 and arranged to mesh with either one of the pinions 160 and 161.

To guide and support the upper ends of the plates 165 and 166, the arcuate strips 171 and 171¹ are mounted respectively on the walls 154 and 155. The strip 171 contains three depressions or apertures, shown at 172, 173 and 174. These apertures are arranged to receive the pin 175 extending through an aperture provided in the upper end of the plate 165. The outer end of the pin 175 contains a slot 176, into which extends one end of a lever 177, pivoted at 178 to a handle piece 179. The outer end of the lever 178 carries the finger piece 180. The handle 179 is formed of strips, as illustrated in Fig. 15, and is rigidly attached to both plates 165 and 166, as most clearly shown in Figs. 15 and 16. To hold the pin 175 normally in the position shown in Fig. 15, the flat spring 181 is utilized, the spring being carried by the plate 165.

When the shaft 126 is rotated and the gearing assumes the position illustrated in Fig. 14, the grooved wheel 164 is driven in a certain direction over the prepared form shown in section at 182 in Fig. 16. If now it is desired to rotate the grooved wheel 164 in the reverse direction, the handle 179 is grasped and the finger-piece 180 depressed by the thumb so as to swing the lever 177 in a counter-clock-wise direction (Fig. 15). This movement of the lever serves to withdraw the pin 175 from the depression 174 so that upward movement of the right hand end of the lever 179 (Fig. 14) to its farthermost position, will cause the plates 165 and 166 to oscillate about the pin 162 and cause the pinion 170 to disengage the pinion 161 and to mesh with the pinion 160.

When the plates 165 and 166 are moved to a position where the pinion 170 meshes with the pinion 160, the pin 175 assumes a position opposite the detent opening 172, so that if the lever 177 is released the spring 181 will act to force the pin into the depression 172 to hold the parts in their advanced or adjusted position.

When the plates 165 and 166 are moved to a position where the pin 175 enters the depression 173, the pinion 170 assumes a neutral position wherein it meshes with neither one of the pinions 160 and 161.

From the description just given it will be observed that the wheel 164 may be rotated in either one of two directions, and that rotation of the wheel 164 may be interrupted without discontinuing rotation of the worm 127.

Attention is also directed to the fact that the entire casing 129, together with its sleeve 128, is swiveled to the tracing mechanism, so that the entire casing 129 may be swung around to any position and may follow a form having any curve. On account of the worm and worm wheel drive on the tracer the casing 129, together with its gears, may swing to any position without in any way interrupting or affecting the mechanical transmission extending between the shaft 126 and the grooved wheel 164.

In order to enable the tracer to be adjusted on its arm 46, the shaft 63 is constructed so that it may be elongated or shortened, and this is accomplished by making the shaft of two parts, one telescoping within the other.

The positioning of the operating handle 89, together with the mechanism for raising and lowering the tracer of the pantograph, makes it possible for the operator to control the entire machine from one side thereof, and from practically one point. This is a very desirable feature in a machine of this class wherein the arms are comparatively long and the machine occupies a considerable amount of space.

Having thus described our invention, what we claim as new and desire to secure by Letters Patent of the United States is:

1. In a machine for forming in desired material a reproduction of a prepared form, the provision of a pantograph having a reproducing arm and a tracing arm, a reproducer mounted on the reproducing arm of the pantograph, a work holder mounted under the reproducer, the reproducer being arranged to move toward or away from the work holder, toggle lever mechanism for moving the reproducer toward or away from the work holder, and devices connected with the lever mechanism and extending to the tracing arm of the pantograph for operating the lever mechanism.

2. In a machine for forming in desired material a reproduction of a prepared form, the provision of a pantograph having a reproducing arm, a reproducer mounted therein and adapted to move in a direction normal to the plane of movement of the reproducing arm, a nut attached to the reproducer, a screw coöperating with the nut, and toggle lever mechanism connected between the screw and reproducing arm for moving the reproducer in either one of two directions normal to the plane of movement of the reproducing arm.

3. In a machine for forming in desired material a reproduction of a prepared form, the provision of a pantograph having a reproducing arm, a reproducer mounted therein, a work holder mounted under the reproducer, the reproducer being arranged to move toward or away from the work holder and relatively to the reproducing arm, a nut carried by the reproducer, a screw extending longitudinally of the reproducer coöperating with the nut and mechanism acting between the screw and reproducing arm for moving the reproducer toward or away from the work holder.

4. In a machine for forming in desired material a reproduction of a prepared form, the provision of a pantograph, an element mounted in one of the arms of the pantograph and arranged to move in a direction at right angles to the plane of movement of the arm, a gear rack carried by the element, a gear meshing with said rack and carried by the pantograph, a handle for rotating the gear, and detent mechanism associated with the gear and handle for locking the gear against movement.

5. In a machine for forming in desired material a reproduction of a prepared form, the provision of a pantograph structure, an element mounted in one of the arms of the pantograph, and arranged to move in a direction at right angles to the plane of movement of the arm, a gear rack carried by the element, a gear meshing with said rack and carried by the pantograph, a handle carried by the pantograph and mounted for movement about the axis of the gear, means for holding said handle in any of its adjusted positions, and detent mechanism carried by the handle and arranged to project between two of the teeth of said gear.

6. In a machine for forming in desired material a reproduction of a prepared form, the provision of a pantograph structure, an element mounted in one of the arms of the pantograph and arranged to move in a direction at right angles to the plane of movement of the arm, a gear rack carried by the element, a gear meshing with said rack and carried by the pantograph, a handle carried by the pantograph and mounted for movement about the axis of the gear, means for holding said handle in any of its adjusted positions, and spring plunger mechanism carried by the handle and arranged to project between two of the teeth provided on said gear.

7. In a machine for forming in desired material, a reproduction of a prepared form, the provision of a pantograph structure having an arm with a longitudinal slot therein, a plate resting against one of the arm faces in which the slot is provided and projecting into the slot, a second plate resting against the opposite face of the arm and projecting into the slot, a second arm and a spindle mounted in the second arm and extending through the said plates.

8. In a machine for forming in desired material a reproduction of a prepared form, the provision of a pantograph structure having an arm with a longitudinal slot therein, a plate resting against one of the faces of the arm containing said slot, and projecting into the slot, a second plate resting against the opposite face of the arm and projecting into the slot, a second arm, a spindle mounted in the second arm and extending through the said plates, and bolts connecting the plates and extending through the said slot in the first arm for locking the plates to the said first mentioned arm.

9. In a machine for forming in desired material a reproduction of a prepared form, the provision of a pantograph having a pair of arms each provided with a longitudinal slot, a third arm, a pair of spindles carried by the third arm, anti-friction bearing mechanism carried by said last mentioned arm between the spindles and the arm, said spindles extending through the slots in the first mentioned pair of arms, and devices for securing the spindles to said pair of arms.

10. In a machine for forming in desired material a reproduction of a prepared form, the provision of a pantograph structure comprising a plurality of pivoted arms, a power driven tracer on the tracing arm of the pantograph, a main pivot for the pantograph and transmission mechanism extending from the main pivot to the tracer around the arms of the pantograph, said mechanism including a pair of intermeshing beveled gears at the point of pivotal connection of two of the arms of the pantograph.

11. In a machine for forming in desired material a reproduction of a prepared form, the provision of a pantograph having a reproducing arm, a tracing arm, a reproducer carried by the reproducing arm, a work holder mounted under the reproducer, means for moving said reproducer toward or away from the work holder, and devices for operating said means, said devices comprising a pair of rods and extending around the arms of the pantograph to the tracing arm thereof and having a flexible joint therein to permit of operation of said devices regardless of the relative positions of the pantograph arms.

12. In a machine for forming in desired material a reproduction of a prepared form, the provision of a pantograph having a tracing arm, a shaft journaled in the tracing arm, a worm carried by the shaft, a bracket swiveled in the tracing arm concentric with and arranged to rotate in a plane normal to the axis of said shaft, a feed roller carried by the bracket and arranged to travel over a prepared form, gearing between the worm and roller, and devices for interrupting the gear connection between the worm and roller.

13. In a machine for forming in desired material a reproduction of a prepared form, the provision of a pantograph having a tracing arm, a shaft journaled in the tracing arm, a worm carried by the shaft, a bracket swiveled in the tracing arm concentric with and arranged to rotate in a plane normal to the axis of said shaft, a pair of worm wheels carried by the bracket and meshing with the worm on diametrically opposite sides thereof, a feed roller carried by the bracket and arranged to travel over a prepared form, and gearing connected with the feed roller and adapted to be driven by either one of said worm wheels.

14. In a machine for forming in desired material a reproduction of a prepared form, the provision of a pantograph having a tracing arm, a shaft journaled in the tracing arm, a worm carried by the shaft, a bracket swiveled in the tracing arm concentric with and arranged to rotate in a plane normal to the axis of said shaft, a pair of worm wheels carried by the bracket and meshing with the worm on diametrically opposite sides thereof, a pinion mounted concentric with and driven by each of said worms, a feed roller carried by the bracket and arranged to travel over a prepared form, a pinion mounted concentric and in driving relation with said roller, gearing meshing with said last mentioned pinion, a support for said gearing, and devices for oscillating said support about the axis of the feed roller to connect the gearing with either one of the said worm wheel pinions.

15. In a machine for forming in desired material a reproduction of a prepared form, the combination of a pantograph having a reproducing arm, a sleeve mounted to reciprocate in the free end of said arm and provided at each end with a casing, a shaft rotatably mounted in said sleeve, and antifriction devices in said casing for supporting the end of said shaft against lateral and longitudinal movement relative to said sleeve.

16. In a machine for forming in desired material a reproduction of a prepared form, the combination of a pantograph having a reproducing arm, a sleeve mounted to reciprocate in the free end of said arm and provided at each end with a casing, a shaft rotatably mounted in said sleeve, and antifriction devices in said casing for supporting the end of said shaft.

17. A milling machine comprising in combination a pantograph having a reproducing arm, a sleeve mounted to reciprocate in said arm, a reproducer mounted in said sleeve, a nut secured to said sleeve, a screw extending parallel with said reproducer and threaded into said nut, means for adjusting said screw in said nut, and means for moving said screw and sleeve bodily together to reciprocate said sleeve in said arm.

18. A milling machine comprising a main supporting shaft, an arm pivotally mounted upon said supporting shaft, a reproducer mounted to reciprocate in said reproducing arm, means for reciprocating said reproducer comprising a slidably mounted rod extending parallel with said first-named arm, a tracing arm pivotally mounted on said first-named arm, a shaft rotatably mounted on said tracing arm, and a flexible joint connection between said rod and said shaft.

19. In a machine for forming in desired material a reproduction of a prepared form, the combination of a pantograph having a tracing arm, a feed roller pivotally supported by said tracing arm, a shaft rotatably mounted on said arm, and means for driving said roller from said shaft in either direction.

20. In a machine for forming in desired material a reproduction of a prepared form, the combination of a pantograph having a tracing arm, a bracket pivotally supported on said arm, a feed roller pivotally mounted on said bracket, a shaft journaled on said arm, and means for driving said feed roller from said shaft in either direction.

In witness whereof we hereunto subscribe our names this 5th day of July, A. D. 1917.

RAY FRAZER.
BURTON J. ROBERTSON.

Witnesses:
A. B. NASH,
L. M. NYHUSE.

Copies of this patent may be obtained for five cents each, by addressing the "Commissioner of Patents, Washington, D. C."